US011303780B2

(12) United States Patent
Wloch

(10) Patent No.: US 11,303,780 B2
(45) Date of Patent: Apr. 12, 2022

(54) COLOR CORRECTION OF IMAGERY HAVING DIFFERENT LEVELS-OF-DETAIL

(71) Applicant: Microsoft Technology Licensing, LLC, Redmond, WA (US)

(72) Inventor: Sebastian Wloch, Villenave d'Ornon (FR)

(73) Assignee: Microsoft Technology Licensing, LLC, Redmond, WA (US)

( * ) Notice: Subject to any disclaimer, the term of this patent is extended or adjusted under 35 U.S.C. 154(b) by 262 days.

(21) Appl. No.: 16/777,627

(22) Filed: Jan. 30, 2020

(65) Prior Publication Data

US 2021/0243335 A1    Aug. 5, 2021

(51) Int. Cl.
*H04N 1/60* (2006.01)
*G06T 11/00* (2006.01)

(52) U.S. Cl.
CPC ......... *H04N 1/6027* (2013.01); *G06T 11/001* (2013.01); *G06T 2210/36* (2013.01)

(58) Field of Classification Search
CPC .. H04N 1/6027; H04N 1/6072; G06T 11/001; G06T 2210/36
See application file for complete search history.

(56) References Cited

U.S. PATENT DOCUMENTS 8,824,794 B1 * 9/2014 Nash ................. G06T 3/4053
382/167

* cited by examiner

*Primary Examiner* — Christopher Wait
(74) *Attorney, Agent, or Firm* — Alleman Hall Creasman & Tuttle LLP

(57) ABSTRACT

A method for color correcting imagery is disclosed. A plurality of images of a scene having different levels of detail is received. A first color correction is determined based on a first reference image and a first target image. The first reference image has a first level of detail and the first target image has a second level of detail greater than the first level of detail. The first color correction is applied to the first target image to generate a first color-corrected image having the second level of detail. A second color correction is determined based on the first color-corrected image and a second target image. The second target image has a third level of detail greater than the second level of detail. The second color correction is applied to the second target image to generate a second color-corrected image.

20 Claims, 6 Drawing Sheets

COLOR CORRECTION OF IMAGERY HAVING DIFFERENT LEVELS-OF-DETAIL

BACKGROUND

Computers may access computer-readable map data (e.g., real-world aerial imagery from satellite imagery, road vector data, etc.) for various purposes. Non-limiting examples of tasks that may be performed by computers using map data include: 1) visually presenting maps for use in navigation, virtual exploration/experience (e.g., within a game), or for any other purpose; 2) performing calculations using maps (e.g., route calculations, collision calculations with regards to landscape features, determining landscape features based on colors/textures/shapes, etc.); 3) generating derived map data based on adding/modifying features of a real-world map (e.g., for architectural planning, video game environments, etc.). In some examples, map data may be used to generate high-detail 3D graphical features. For example, a game environment may include high-detail geographic features that are based on aerial imagery. Aerial imagery may be used herein to refer to imagery of the ground and/or geographic features from any suitable altitude, e.g., satellite imagery, plane imagery, etc.

SUMMARY

A method for color correcting imagery is disclosed. A plurality of images of a scene having different levels of detail is received. A first color correction is determined based on a first reference image and a first target image of the plurality of images. The first reference image has a first level of detail and the first target image has a second level of detail greater than the first level of detail of the first reference image. The first color correction is applied to the first target image to generate a first color-corrected image having the second level of detail. A second color correction is determined based on the first color-corrected image and a second target image of the plurality of images. The second target image has a third level of detail greater than the second level of detail of the first color-corrected image. The second color correction is applied to the second target image to generate a second color-corrected image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
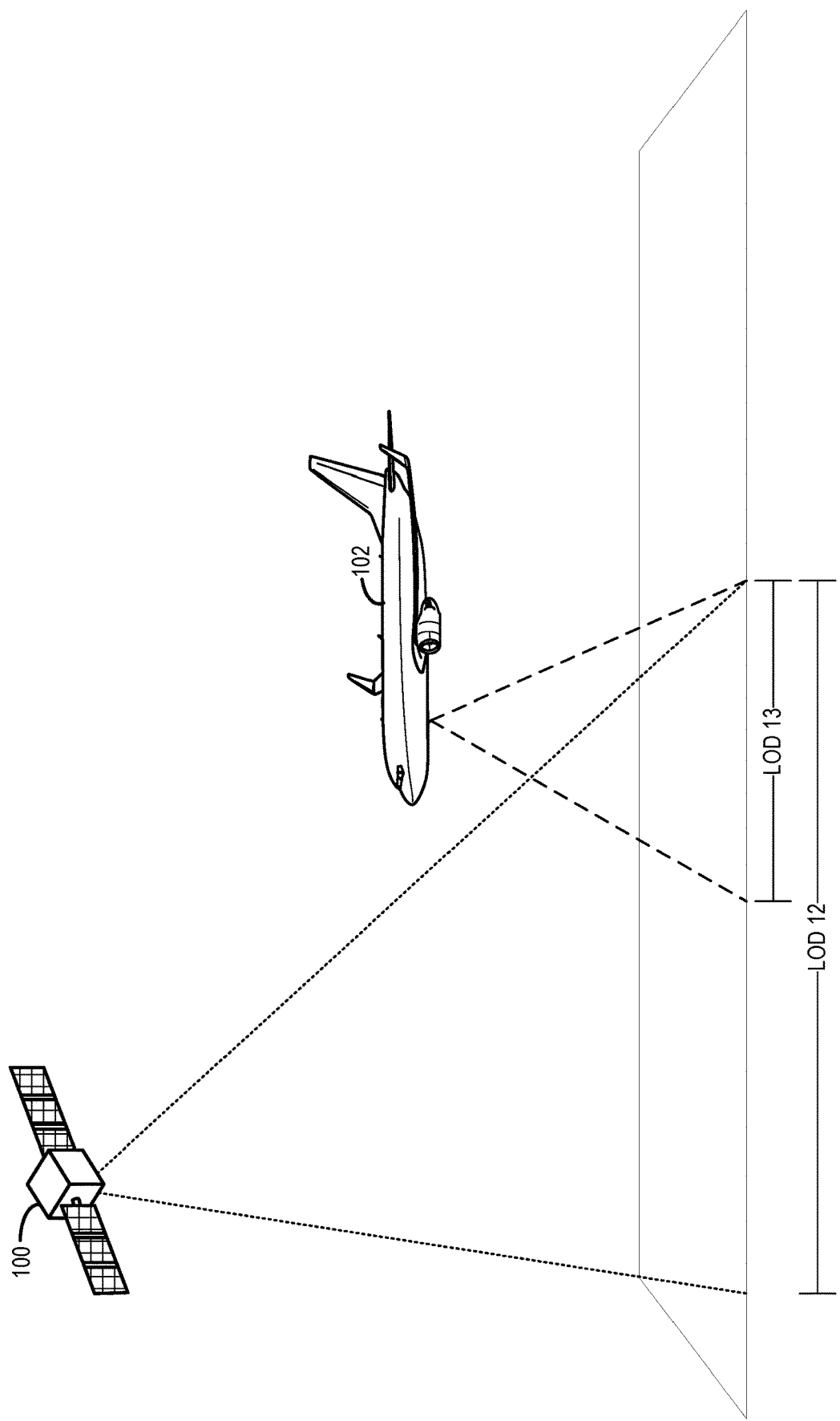
FIG. 1 shows an example scenario in which image is captured at different distances with different levels of detail.

Map data may be provided by various sources, in different formats, at different levels of detail, and so as to include different features. For example, map data may include aerial images representing colors, textures, etc. As used herein, the term "level of detail" refers to a hierarchical classification structure for imagery of a scene (e.g., map imagery). The different levels of the hierarchical classification structure may have a consistent quantifiable difference in detail from level to level in which the lowest level of the structure has the lowest level of detail and the level of detail increases with each level of the structure to the highest level. In one example, a level-of-detail hierarchical classification structure may include 20 levels of detail. Each image in each level may include 256 by 256 pixels. A 256 by 256 pixel image may be at the lowest level of detail (level of detail 1). An image at the next level of detail (level of detail 2) may have 4 times the level of detail of the image in the lower level (level of detail 1). In other words, every 4 pixels in the lower level of detail image (level of detail 1) may map to 1 pixel of the higher level of detail image (level of detail 2). This increase in the level of detail may be consistent going up from level to level throughout the entire structure (e.g., 4×256×256, 16×256×256, 64×256×256 . . . ). A level-of-detail hierarchical classification structure may include any suitable number of levels, and any suitable quantifiable difference in detail between different levels. Further, images at each of the levels may have any suitable pixel resolution.

Map data from one or more different sources may be assessed according to a shared coordinate system (e.g., longitude, latitude, and/or altitude at any suitable degree of precision), for example, to integrate aerial imagery from different levels of detail. As an example, shown in FIG. 1, image data from a satellite 100 may be available at level of detail 12, whereas image data from an airplane 102 may be available at level of detail 13 or higher. Although image data may be captured at various level of details, image data captured at different level of details may be adjusted to match a particular resolution (e.g., by upscaling or downscaling as necessary). As an example, level of detail 12 image data and level of detail 13 image data may be scaled to be viewed, manipulated, and/or stored at a common resolution, for example, at a native resolution for the level of detail 13 image data. In some examples, images from different level of details may be used to assemble a map out of image tiles at different resolutions, for example, to facilitate viewing a map at level of detail 12 and a zoomed in version of the same map using level of detail 13 images.

In many cases, although a computer system may be configured to access aerial imagery data from one or more different sources, the aerial imagery data may have inconsistent and/or incorrect coloration. For example, aerial images of different areas may have inconsistent coloration, even when the aerial images are accessed from a single provider of aerial images. As an example, images from a single source may vary in coloration due to time-varying lighting conditions, weather conditions (e.g., cloud cover), and seasonal conditions (e.g., green grass, leaves on/off trees), etc. Furthermore, images from the same and/or different sources may further vary in coloration based on different imaging equipment, techniques, etc. These differences in coloration may be undesirable for using aerial images for various map-related tasks as described above.

For example, when aerial imagery data is used to derive map data for a video game, differences in coloration may result in discontinuous map features, spurious map features resulting from coloration artifacts, etc. As an example, two different images of nearby areas at level of detail 13 may have different coloration from each other, even when the nearby areas in actuality have the same coloration (e.g., as may be apparent from a different, level of detail 12 image that encompasses both of the nearby areas). If the two different images are used to derive map data for a video game, the differences in color could result in spurious differences between the two areas (e.g., different terrain, etc.) in the derived map data. More generally, inconsistent colors in different portions of aerial imagery may lead to other spurious and/or incorrect results when performing calculations using the aerial imagery (e.g., when performing image-processing calculations to recognize environmental features in the aerial imagery). Furthermore, differences in coloration between adjacent areas in aerial imagery may be visually jarring and/or convey inaccurate information to human viewers.

The present disclosure is directed to an approach for color-correcting aerial imagery having different level of details based on the assumption that lower level of detail images of a scene have higher color accuracy (e.g., due to smaller contributions from atmospheric interference) than corresponding higher level of detail images of the same scene. According to such an approach, a color correction may be determined based on a reference image having a lower level of detail. The color correction may be applied to a target image having a higher level of detail than the lower level of detail of the reference image in order to generate a color-corrected target image having the higher level of detail. For example, the lower level of detail image may be a satellite image at level of detail 12, and the higher level of detail image may be an aerial photograph at level of detail 13 or higher. Subsequently, the color-corrected target image may be used as a reference image to color-correct another target image having an even higher level of detail. Color corrections may be applied iteratively in this manner across images having different level of detail s from low-to-high to color correct the images.

In some implementations, the color-correction results may be saved as coefficients that may be efficiently stored in a relatively small amount of computer memory. The coefficients may be used to color-correct images, for example, in a game client. Alternately or additionally, color-corrected images may be precomputed and stored for later use, for example, by the game client.

Figure 2:
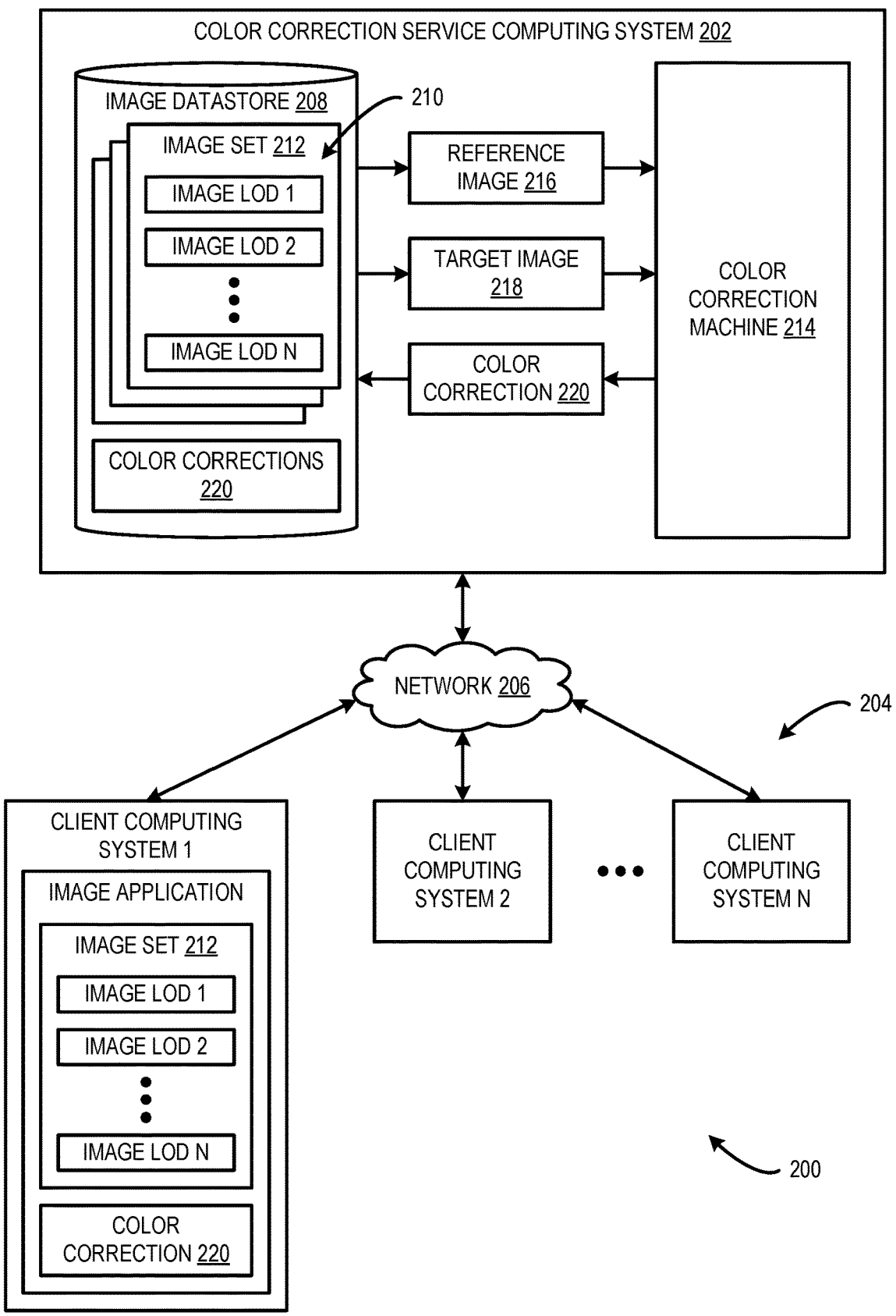
FIG. 2 schematically shows an example computing environment in which a color-correction approach as described herein may be implemented.

FIG. 2 schematically shows an example computing environment 200 in which the herein-described color-correction approach may be implemented. The computing environment 200 includes a color-correction service computing system 202 configured to communicate with a plurality of client computing systems (e.g., client computing system 1, client computing system 2, client computing system N) 204 via a computer network 206, such as the Internet. The color-correction service computing system 202 may be configured to perform color correction operations for different sets of images having different level of details such that the client computing systems 204 may obtain color-corrected images with minimal on-board processing.

The color-correction service computing system 202 includes an image datastore 208 configured to store a plurality of images 210. For example, the images may include aerial imagery having inconsistent coloration. Such inconsistencies may occur for various reasons. As an example, such inconsistencies in coloration may be due to different images being provided by different providers or sources, or assembled from images captured at different times. As another example, such inconsistencies in coloration may be due to image processing operations performed on an image (e.g., blending multiple images to form a composite image). As yet another example, such inconsistencies in coloration may be due to environmental conditions when the image was captured. The plurality of images 210 may include any suitable content including any suitable aerial scenery. The plurality of images 210 may have any suitable level of detail. The images 210 may be provided to the service computing system 202 from any suitable source. Non-limiting examples of such image sources include satellite imagery providers, aerial imagery providers, and mapping services.

In some examples, the plurality of images 210 may be organized into different image sets 212. Each image set 212 may include images of a scene having different levels of detail (e.g., image having LOD 1, image having LOD 2, image having LOD N). As an example, an image set 212 may include a series of images having different levels of detail that increase from a lower level of detail (e.g., LOD 1) to a higher level of detail (e.g., LOD N). In some examples, each image in an image set may have a different level of detail. In other examples, two or more of the images in an image set may have the same level of detail that differs from other levels of detail of other images in the image set. Image sets 212 may be created to facilitate color correction of the images in each set as discussed in further detail herein. An image set may include any suitable number of images having any suitable different levels of detail. Different images sets may include different numbers of images.

The color correction service computing system 202 further includes a color correction machine 214 configured to perform color correction operations on images stored in the image datastore 208. The color correction machine 214 may be implemented by the service computing system 202 as software, hardware, firmware, or any combination thereof. The color correction machine 214 is configured to receive a reference image 216 and a target image 218 from the image datastore 208. The reference image 216 may have a lower level of detail than a level of detail of the target image 218. In one example, the source image may have a resolution of 256 by 256 pixels and the target image may have a quarter of the level of detail of the reference image (i.e., a level of detail corresponding to a 128×128 pixel region having exactly half of the resolution of the reference image). However, the reference image 216 is assumed to generally have more accurate coloration image-wide than the target image 218. The higher color accuracy may be due to various factors including smaller contributions from atmospheric interference (e.g., clouds, rain, sunlight), since lower level of detail images are usually provided from satellite imagery providers. At higher levels of detail, coloration problems can also result from image components coming from different sources, from image component stitching issues, etc. That said, the reference and target images may have any suitable levels of detail and may be provided from any suitable source(s). Further, the target image 218 may include various artifacts, color palette changes, etc. that contribute to having lower color accuracy relative to the color accuracy of the reference image 216. In many cases, these issues derive from the higher resolutions and detail at the higher level of detail of the target.

The color correction machine 214 may be configured to apply a multi-pass color correction algorithm to the target image 218 to bring the color of target image 218 in line with the color of the reference image 216 while preserving the desirable/accurate aspects of target image 218 (e.g., the higher level of detail and resolution). In one example, the multi-pass algorithm may selectively perform up to three passes or three sets of operations to color correct the target image 218. The number of passes that is performed by the algorithm may be based on assessments of whether a particular pass has sufficiently corrected/aligned the color of the target image 218 with the color of the reference image 216. For example, if a first-pass color correction sufficiently corrects the color of the target image based on the error assessment, then the color correction machine 214 outputs a color-corrected image based on the first-pass color correction. Otherwise, the second-pass color correction is performed. If the second-pass color correction sufficiently corrects the color of the target image based on the error assessment, then the color correction machine 214 outputs a color-corrected image based on the second-pass color correction. Otherwise, the third-pass color correction is performed, and the color correction machine 214 outputs a color-corrected image based on the third-pass color correction.

It will be appreciated that the multi-pass algorithm may include any suitable of different passes or sets of operations that may be selectively performed to color-correct an image.

In some examples, the first-pass color correction is a general color correction that works globally to correct differences in brightness and contrast between the target image 218 and the reference image 216. For the first-pass color correction, the color correction machine 214 is configured to determine a contrast correction transformation matrix ($F_{mul}$) that is based on the reference image 216 and the target image 218. The contrast correction transformation matrix includes a matrix of coefficients corresponding to a number of pixels of the target image 218. In one example, the contrast correction transformation matrix is determined based on the equation shown below.

$$F_{mul}=\text{REF deviation}/\text{TARG deviation}.$$

In this equation, the coefficients of the contrast correction transformation matrix $F_{mul}$ are equal to a quotient of a standard deviation of the pixel values of the reference image 216 and a standard deviation of the pixel values of the target image 218. The color correction machine 214 is configured to apply the contrast correction transformation matrix to the target image 218. In this case, each coefficient of the contrast correction transformation matrix $F_{mul}$ is the same, such that the contrast of the target image 218 may be globally shifted to align with the reference image 216. In other words, the same transformation coefficient is applied to each pixel of the image. In some examples, the color correction machine 214 may apply the contrast correction transformation matrix to each color channel of the target image 218. The color correction machine 214 may apply the contrast correction transformation matrix to the target image 218 in any suitable manner.

Furthermore, the color correction machine 214 is configured to determine a brightness correction transformation matrix ($F_{add}$). The brightness correction transformation matrix ($F_{add}$) is based on the reference image 216, the target image 218, and is derived from the contrast correction transformation matrix ($F_{mul}$). The brightness correction transformation matrix includes a matrix of coefficients corresponding to a number of pixels of the target image 218. In one example, the brightness correction transformation matrix is determined based on the equation shown below.

$$F_{add}=\text{REF average}-(\text{TARG average}*F_{mul}).$$

In this equation, the coefficients of the brightness correction transformation matrix $F_{add}$ are equal to a difference of an average pixel value of the reference image 216 and an average pixel value of the target image 218 multiplied with the contrast correction transformation matrix $F_{mul}$. The color correction machine 214 is configured to apply the brightness correction transformation matrix to the target image 218. In this case, each coefficient of the brightness correction transformation matrix $F_{mul}$ is the same, such that the brightness of the target image 218 may be globally shifted image wide to align with the reference image 216. In some examples, the color correction machine 214 may apply the brightness correction transformation matrix to each color channel of the target image 218. The color correction machine 214 may apply the brightness correction transformation matrix to the target image 218 in any suitable manner.

In some examples, only one of the brightness correction transformation matrix or the contrast correction transformation matrix may be applied to the target image for color correction. In other examples, both of the brightness correction transformation matrix and the contrast correction transformation matrix may be applied to the target image for color correction.

In some examples, the brightness correction transformation matrix and/or the contrast correction transformation matrix may be applied to the target image as image transformations in order to improve processing performance. Such example image transformations equations are shown below.

$$\text{TempImage1}=\text{SourceImage}*F_{mul}$$

$$\text{TargetImage}=\text{TempImage}+F_{add}$$

Further, in examples where the computing system performing the color correction has a graphics library or hardware that allows for $f_{madd}$ (floating multiply-add) operations to be performed, the the Fmul and Fadd coefficients may be applied to the target image directly as one image filter. Such an example image transformation equation is shown below.

$$\text{TargetImage}=\text{SourceImage}*F_{mul}+F_{add}$$

After the color correction machine 214 has applied the contrast and brightness correction transformation matrices to the target image 218 to shift the contrast and brightness of the target image, the color correction machine 214 is configured to determine an error between the reference image 216 and the first-pass color-corrected target image. The error between the reference image 216 and the first-pass color-corrected target image may be determined in any suitable manner. In one example, the error may be determined by calculating a difference in average pixel value. More particularly, the error may be calculated as the sum of the squared differences, pixel by pixel, between the source and target images. In some examples, the error may be calculated across the different color channels of the images.

The color correction machine 214 is configured to assess whether the error between the reference image 216 and the first-pass color-corrected target image is less than a threshold. The error threshold may be set to any suitable value. If the error is less than the threshold, then the color correction machine 214 deems that the target image 218 is sufficiently color-corrected via the first-pass color correction. Otherwise, if the error exceeds the threshold, the color correction machine 214 is configured to apply a second-pass color correction to the target image 218.

For the second-pass color correction, the color correction machine 214 is configured to identify one or more regions of interest in either or both the reference image 216 or the target image 218, where the one or more regions of interest have a color difference that is greater than a color difference threshold. The color difference threshold may be set to any suitable value. The color difference threshold may indicate that the region(s) of interest have vastly different color values relative to other regions in the corresponding image, such that the region(s) of interest may skew the overall color assessment of the corresponding image. Such regions may occur for a variety of reasons. For example, such regions may be formed by artifacts that are created due blurring, blending, compositing, and/or other image processing operations.

The color correction machine 214 is configured to re-determine the first-pass color correction while either modifying or ignoring the identified one or more regions of interest (i.e., the problematic regions are not factored into the re-determination workflow, so as to reduce or eliminate their impact on the correction). In some examples where a region of interest is located in the target image, the region of interest may be modified by copying corresponding pixels of the region of interest in the reference image to the target image in an operation that may be referred to as "in-painting." Similarly, in some examples where a region of interest is located in the reference image, the region of interest may be modified by copying corresponding pixels of the region of interest in the target image to the reference image. In these examples, the first-pass color correction is determined using the modified image. In particular, the contrast and brightness transformation matrices are re-determined based on the in-painted image. In examples where the region(s) of interest are ignored, the contrast and brightness transformation matrices are re-determined without using the pixels in the region(s) of interest. In some examples, regions of interest may be identified in both reference and target images. In other examples, region(s) of interest may be identified in only one of the reference image or the target image.

The color correction machine 214 is configured to apply the re-determined and contrast and brightness transformation matrices to the uncorrected target image 218 to perform the second-pass color correction. After the color correction machine 214 has applied the contrast and brightness correction transformation matrices to the target image 218 for the second-pass color correction, the color correction machine 214 is configured to determine an error between the reference image 216 and the second-pass color-corrected target image. The error between the reference image 216 and the second-pass color-corrected target image may be determined in any suitable manner.

The color correction machine 214 is configured to assess whether the error between the reference image 216 and the second-pass color-corrected target image is less than a threshold. The error threshold may be set to any suitable value. If the error is less than the threshold, then the color correction machine 214 deems that the target image 218 is sufficiently color corrected via the second-pass color correction. Otherwise, if the error exceeds the threshold, the color correction machine 214 is configured to apply a third-pass color correction to the target image 218.

For the third-pass color correction, the color correction machine 214 is configured to determine local matrices of contrast correction transformations and brightness correction transformations (i.e., standard deviation and average calculations) for regions of one or more pixels in the reference and target images. The local matrices may provide finer granularity of color correction relative to the global color corrections performed in the first-pass and second-pass color corrections. The reference and target images may be divided into any suitable number of regions and each region may include any suitable number of pixels. In some examples, the number of pixels per region may be determined based on a difference in resolution between the reference image 216 and the target image 218. As an example, a reference image and a target image may have a pixel resolution difference of 4:1. Correspondingly, the local regions for the third-pass color correction may include 4 pixels. These local matrices may include correction coefficients that differ from region to region to provide a more granular color correction.

In some implementations, the color correction machine 214 may be configured to apply the local matrices of contrast correction transformations and brightness correction transformations to the uncorrected target image 218 to perform the third-pass color correction. The resulting third-pass color-corrected target image may have localized color correction that more accurately aligns with the coloration of the reference image relative to the first and second pass color corrections. However, in some cases, the color-corrected target image may include areas where the color palette or exposure changes rapidly, such as for a cut or seam.

In some implementations, the color correction machine 214 optionally may be configured to calculate derivatives of the contrast correction transformations and brightness correction transformations of the local matrices to generate masked local matrices. The masked local matrices may identify areas of the target image that include a cut, seam, artifact, or other drastic color difference. In particular, the greater the derivative value the sharper the change in color. Further, the color correction machine 214 optionally may be configured to perform a blurring operation on the masked local matrices to generate blurred masked local matrices. Such blurring of the masked local matrices allows for a less aggressive color correction moving away from the areas where the cut, seam, or other drastic color change is located on the target image. The color correction machine 214 optionally may be configured to apply the blurred masked local matrices to the uncorrected target image 218 to perform the third-pass color correction.

In accordance with the multi-pass color correction algorithm, the first-pass color correction typically is the fastest and least computationally expensive to perform of the three different color corrections. The first-pass color correction may be sufficient to color correct a majority of images. The second-pass color correction may be slightly slower and more computationally expensive than the first-pass color correction, but may be able to handle images having areas with large color differences. The third-pass color correction is the slowest and most computationally expensive to perform of the three different color corrections. The third-pass color correction may be used the least frequently of the three different color corrections in order to color correct images having specific color issues due to cuts, seams or other artifacts.

The color correction machine 214 may be configured to output a color correction 220 for the target image 218 based on performing either the first-pass color correction, the second-pass color correction, or the third-pass color correction. The target image 218 may be color corrected using these different color corrections until color correction machine 214 deems the color of the color-corrected target image to be sufficiently aligned with the reference image. In some examples, the color correction 220 may include the color-corrected target image. In some examples, the color correction 220 additionally or alternatively may include the matrices of coefficients used to color-correct the target image 218.

The color correction machine 214 may output the color correction 220 to the image datastore 208. The image datastore 208 may be configured to store the color correction 220 such that the color correction may be available for later use. For example, the color-corrected target image may be provided to the color correction machine 214 as a reference image to be used to color correct another target image having a higher level of detail than the color-corrected target image. In this manner, the color correction machine 214 may color-correct entire image sets.

Figure 3:
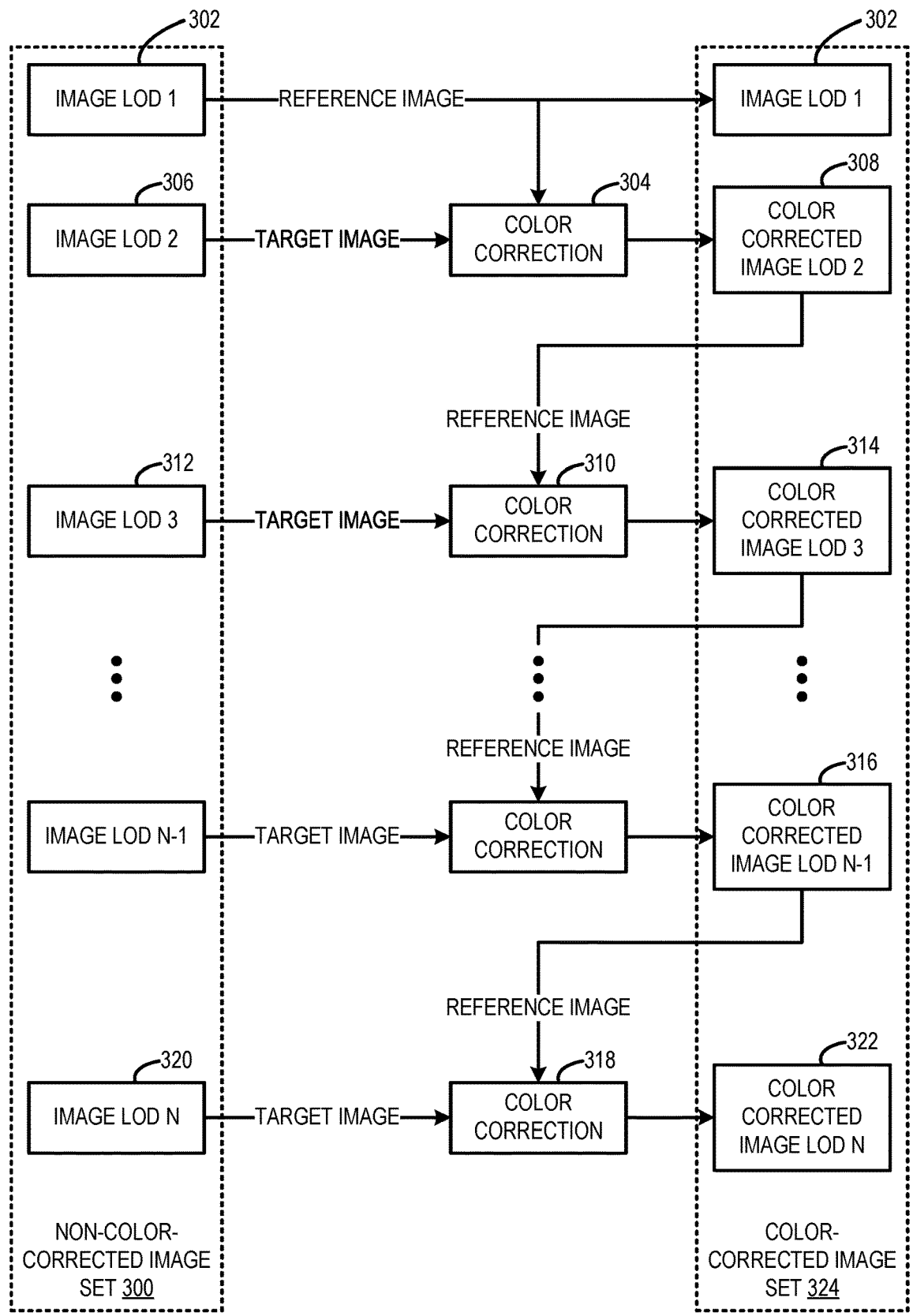
FIG. 3 schematically shows an example iterative approach for color correcting images having different levels of detail.

FIG. 3 schematically shows an example scenario in which an image set is color corrected using such an iterative approach. A non-color-corrected image set 300 includes a plurality of images having different levels of detail ranging from a lowest level of detail (LOD 1) to a highest level of detail (LOD N). Note that the reference numbers associated with the levels of detail (e.g., 1, 2, 3, N−1, N) are arbitrary, but the level of detail increases from 1 to N. Images in the image set 300 may have any suitable level of detail. A first image 302 having a first level of detail that is the lowest level of detail in the image set 300 is used as an initial reference image to perform a first color correction 304 on a target image 306 having a second level of detail that is greater than the first level of detail to generate a first color-corrected target image 308 having the second level of detail. The first color-corrected target image 308 is then used as a reference image to perform a second color correction 310 on a third image 312 having a third level of detail that is greater than the second level of detail to generate a second color-corrected target image 314 having the third level of detail. The second color-corrected target image 314 is then used as a reference image to perform a next color correction on a next image in the image set 300 having a higher level of detail than the third level of detail. Color corrections are performed iteratively for each image in the image set 300 finishing with the color-corrected target image 316 having a level of detail N−1 being used as a reference image to perform a color correction 318 on a target image 320 having a level of detail N that is greater than the level of detail N−1 to generate a color-corrected target image 322 having the level of detail N. Such iterative color corrections may be performed to generate a color-corrected image set 324.

Returning to FIG. 2, in some implementations, the color correction machine 214 may be configured to color correct entire image sets in batches, and then output the color corrections for the entire image set. In some examples, these color corrections may include an entire set of color-corrected images. In other examples, these color correction may include matrices of coefficients used to color correct the target images of the image set.

The service computing system 202 may be configured to precompute color corrections for a vast number of images such that the service computing system 202 can provide color corrections 220 to the plurality of client computing systems 204 on-demand. In particular, the service computing system 202 may receive requests for color corrections for different target images from different client computing systems. Responsive to receiving a request, the service computing system 202 may send the color correction(s) to the requesting client computing system. In some examples, the service computing system 202 may send the coefficients of the transformation matrices used to color correct the image identified by the client. For example, the client computing system may store the uncorrected images (e.g., image set 212) locally, and receive the coefficients from the service computing system 202. The client computing system may perform the color corrections locally using the coefficients received from the service computing system 202. By sending just the coefficients and not the entire color-corrected image to the client computing system, the color correction data may be transferred to the client computing system quickly and the color correction data may be efficiently stored in a small amount of computer memory. In some examples, the coefficients may be sent to the client computing system on-demand at runtime to color-correct images, for example, in a game client. Alternately or additionally, color-corrected images may be precomputed and sent to the client computing system, and the client computing system may store the color-corrected images for later use, for example, by the game client. The client computing systems may receive color corrections for images for any suitable applications. Nonlimiting example applications that may use such color-corrected imagery include video games and mapping applications.

Figure 4:
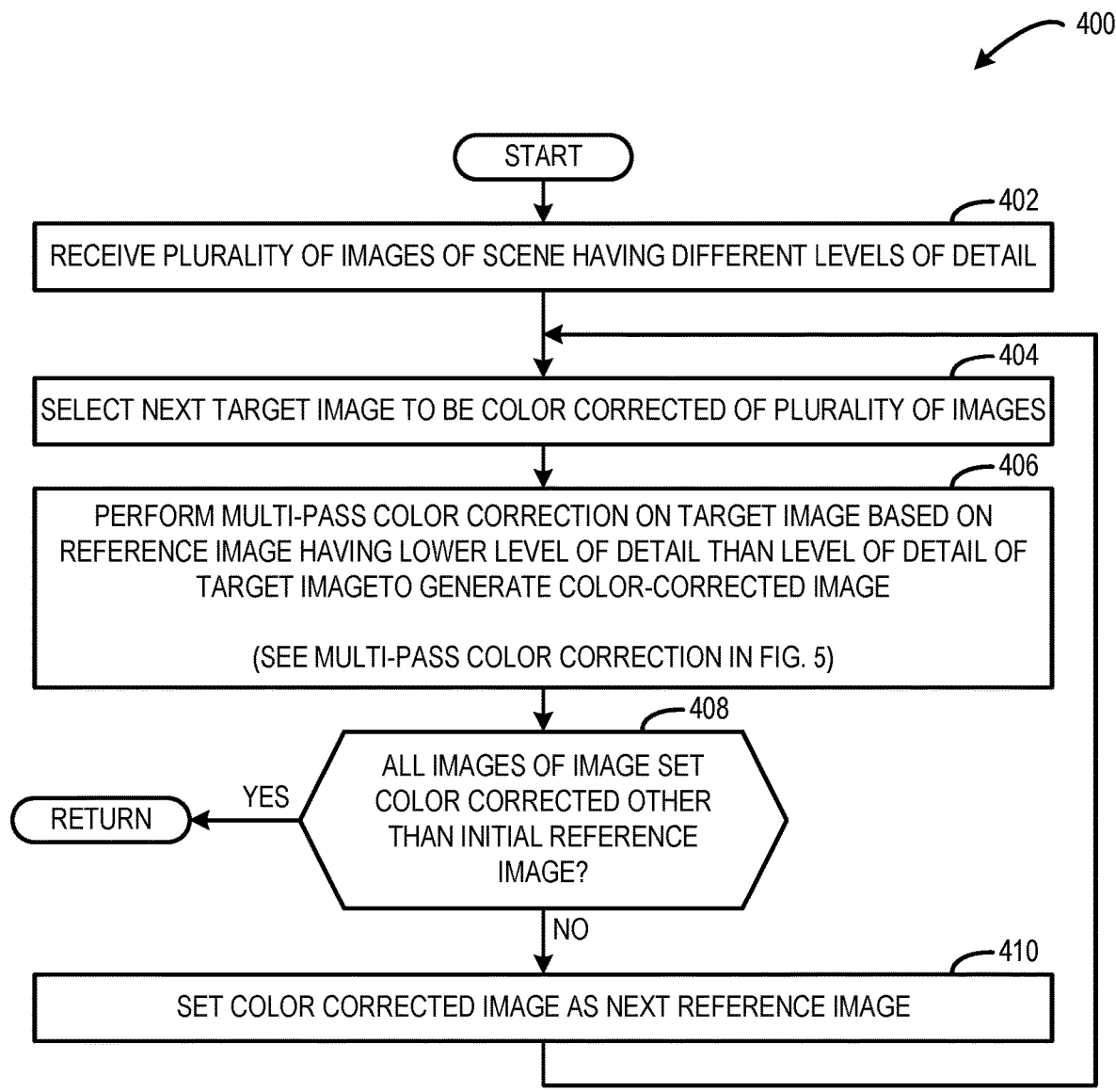
FIG. 4 shows a flowchart of an example method for color-correcting imagery.

FIG. 4 shows an example method 400 for color correcting imagery. For example, the method 400 may be performed by the service computing system 202 shown in FIG. 2. Generally, the method 400 may be performed by any suitable computing system. At 402, a plurality of images of a scene having different levels of detail is received. At 404, a next image of the plurality of image to be color corrected is selected. Initially, an image having a lowest level of detail is selected as a reference image, and an image having the next lowest level of detail is selected as the target image to be color corrected. In some examples, the image having the lowest level of detail may be color corrected prior to the method 400 being performed. At 406, a multi-pass color correction is performed on the target image to generate a color-corrected image having a same level of detail as the target image. The multi-pass color correction is based on the reference image, such that the color of the target image is shifted to more closely align with the color of the reference image.

Figure 5:
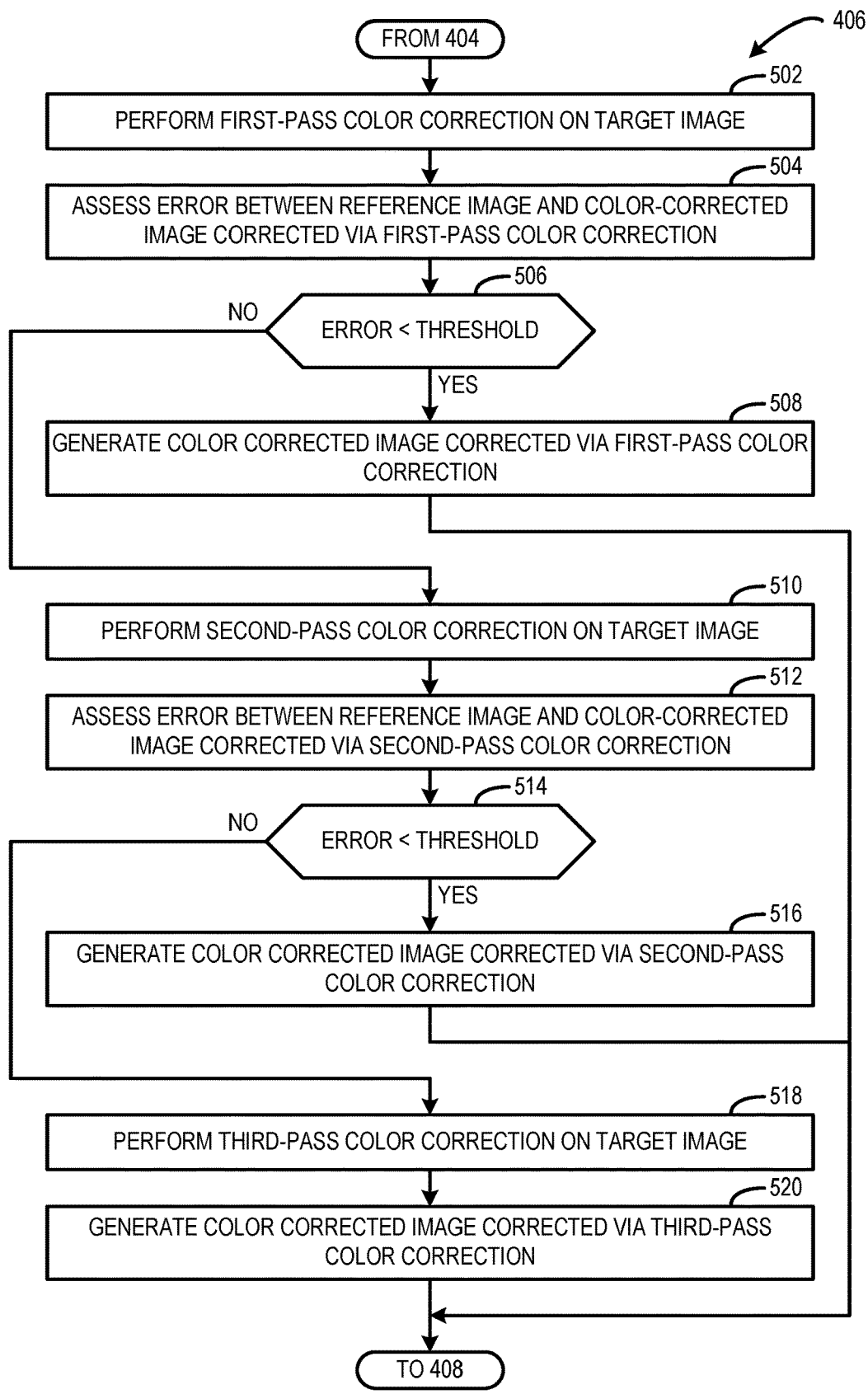
FIG. 5 shows a flowchart of an example multi-pass color correction method.

FIG. 5 shows an example method for performing the multi-pass color correction. At 502, a first-pass color correction is performed on the target image. For example, the first-pass color correction may be performed, as discussed above, by determining brightness and contrast correction transformation matrices and applying the matrices to the target image. At 504, an error between the reference image and the color-corrected image corrected via the first-pass color correction is assessed. At 506, if the error is less than a threshold, the color of the color-corrected image is deemed to be sufficiently aligned with the reference image and the method moves to 508. Otherwise, the method moves to 510. At 508, the color-corrected image corrected via the first-pass color correction is generated and the method returns to 408 shown in FIG. 4.

At 510, a second-pass color correction is performed on the target image. For example, the second-pass color correction may be performed, as discussed above, by identifying one or more regions of interest in either or both of the reference image or the target image. The region(s) of interest may include color differences that are greater than a threshold, such that the region(s) of interest skew color correction of the entire image. Such region(s) of interest may be modified or ignored, and the first-pass color correction is applied to the modified image or without consideration of the region(s) of interest to generate a color-corrected image corrected via the second-pass color correction. At 512, an error between the reference image and the color-corrected image corrected via the second-pass color correction is assessed. At 514, if the error is less than a threshold, the color of the color-corrected image is deemed to be sufficiently aligned with the reference image and the method moves to 516. Otherwise, the method moves to 518. At 516, the color-corrected image corrected via the second-pass color correction is generated and the method returns to 408 shown in FIG. 4.

At 518, a third-pass color correction is performed on the target image. For example, the third-pass color correction may be performed, as discussed above, by determining local brightness and contrast correction transformation matrices for regions of pixels and applying the local matrices to the target image. In some embodiments, additional masking and blurring operations optionally may be performed on the local matrices prior to the local matrices being applied to the target image, as discussed above. At 520, the color-corrected image corrected via the third-pass color correction is generated and the method returns to 408 shown in FIG. 4.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 6:
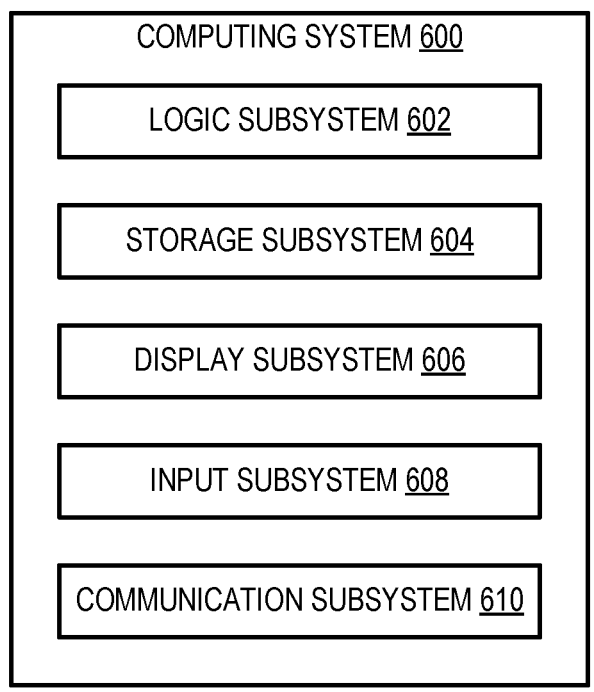
FIG. 6 schematically shows an example computing system.

FIG. 6 schematically shows a simplified representation of a computing system 600 configured to provide any to all of the compute functionality described herein. Computing system 600 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, camera system, robotic device, autonomous vehicle, and/or other computing devices. For example, computing system 600 may take the form of service computing system 202 and/or any of the plurality of client computing systems 204 shown in FIG. 2.

Computing system 600 includes a logic subsystem 602 and a storage subsystem 604. Computing system 600 may optionally include a display subsystem 606, input subsystem 608, communication subsystem 610, and/or other subsystems not shown in FIG. 6.

Logic subsystem 602 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 604 includes one or more physical devices configured to temporarily and/or permanently hold computer information such as data and instructions executable by the logic subsystem. When the storage subsystem includes two or more devices, the devices may be collocated and/or remotely located. Storage subsystem 604 may include volatile, nonvolatile, dynamic, static, read/write, read-only, random-access, sequential-access, location-addressable, file-addressable, and/or content-addressable devices. Storage subsystem 604 may include removable and/or built-in devices. When the logic subsystem executes instructions, the state of storage subsystem 604 may be transformed—e.g., to hold different data.

Aspects of logic subsystem 602 and storage subsystem 604 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 606 may be used to present a visual representation of data held by storage subsystem 604. This visual representation may take the form of a graphical user interface (GUI). Display subsystem 606 may include one or more display devices utilizing virtually any type of technology. In some implementations, display subsystem may include one or more virtual-, augmented-, or mixed reality displays.

When included, input subsystem 608 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 610 may be configured to communicatively couple computing system 600 with one or more other computing devices. Communication subsystem 610 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for color correcting imagery performed by a computing system, the method comprises receiving a plurality of images of a scene having different levels of detail, determining a first color correction based on a first reference image and a first target image of the plurality of images, where the first reference image has a first level of detail and the first target image has a second level of detail greater than the first level of detail of the first reference image, applying the first color correction to the first target image to generate a first color-corrected image having the second level of detail, determining a second color correction based on the first color-corrected image and a second target image of the plurality of images, where the second target image has a third level of detail greater than the second level of detail of the first color-corrected image, and applying the second color correction to the second target image to generate a second color-corrected image having the third level of detail. In this example and/or other examples, determining the first color correction may include determining a contrast correction transformation matrix based on the first reference image and the first target image, and determining a brightness correction transformation matrix based on the first reference image and the first target image, and applying the first color correction may include applying the contrast correction transformation matrix and/or the brightness correction transformation matrix to the first target image. In this example and/or other examples, the method may further comprise assessing a first error between the first reference image and the first color-corrected image, responsive to the first error exceeding a first threshold, applying a second-pass color correction to the first target image, where the second-pass color correction includes 1) identifying one or more regions of interest in either the first reference image or the first target image, the one or more regions of interest having a color difference greater than a color difference threshold, 2) re-determining the first color correction based on the first reference image and the first target image while either modifying or ignoring the one or more regions of interest, and 3) applying the re-determined first color correction to the first target image to re-determine the first color-corrected image based on the second-pass color correction. In this example and/or other examples, modifying the one or more regions of interest may include copying pixels in the one or more regions of interest between the reference image and the target image. In this example and/or other examples, the method may further comprise assessing a second error between the first reference image and the first color-corrected image as re-determined based on the second-pass color correction, and responsive to the second error exceeding a second threshold, applying a third-pass color correction to the first target image. In this example and/or other examples, the third-pass color correction may include 1) determining local matrices of contrast correction transformations and brightness correction transformations based on regions of one or more pixels of the first reference image and the first target image, and 2) applying the local matrices of contrast correction transformations and brightness correction transformations to the first target image. In this example and/or other examples, the third-pass color correction may further include 1) calculating derivatives of the contrast correction transformations and brightness correction transformations of the local matrices to generate masked local matrices, and 2) applying the masked local matrices to the first target image. In this example and/or other examples, the third-pass color correction may further include 1) performing a blurring operation on the masked local matrices to generate blurred masked local matrices and 2) applying the blurred masked local matrices to the first target image. In this example and/or other examples, the method may further comprise sending, via a computer network, the first color correction and the second color correction to a remote computing system configured to store the first target image and the second target image, and where the remote computing system is configured to apply the first color correction to the first target image to generate the first color-corrected image and apply the second color correction to the second target image to generate the second color-corrected image. In this example and/or other examples, coefficients of a contrast correction transformation matrix and/or coefficients of a brightness correction transformation matrix corresponding to each of the first color correction and the second color correction may be sent to the remote computing system.

In an example a computing system comprises a logic subsystem, a storage subsystem holding instructions executable by the logic subsystem to receive a plurality of images of a scene having different levels of detail, determine a first color correction based on a first reference image and a first target image of the plurality of images, where the first reference image has a first level of detail and the first target image has a second level of detail greater that the first level of detail of the first reference image, apply the first color correction to the first target image to generate a first color-corrected image having the second level of detail, determine a second color correction based on the first color-corrected image and a second target image of the plurality of images, where the second target image has a third level of detail greater than the second level of detail of the first color-corrected image, and apply the second color correction to the second target image to generate a second color-corrected image having the third level of detail. In this example and/or other examples, determining the first color correction may include determining a contrast correction transformation matrix between the first reference image and the first target image, determining a brightness correction transformation matrix between the first reference image and the first target image and derived from the contrast correction transformation matrix, and applying the first color correction may include applying the contrast correction transformation matrix and/or the brightness correction transformation matrix to the first target image. In this example and/or other examples, the contrast correction transformation matrix may be based on a quotient of a standard deviation of pixel values of the reference image and a standard deviation of pixel values of the target image. In this example and/or other examples, the brightness correction transformation matrix may be based on a difference of an average pixel value of the reference image and an average pixel value of the target image multiplied by the contrast correction transformation matrix. In this example and/or other examples, the storage subsystem may further hold instructions executable by the logic subsystem to assess a first error between the first reference image and the first color-corrected image, responsive to the first error exceeding a first threshold, apply a second-pass color correction to the first target image, where the second-pass color correction includes 1) identifying one or more regions of interest in either the first reference image or the first target image, the one or more regions of interest having a color difference greater than a color difference threshold, 2) re-determining the first color correction based on the first reference image and the first target image while either modifying or ignoring the one or more regions of interest, and 3) applying the re-determined first color correction to the first target image to generate the first color-corrected image based on the second-pass color correction. In this example and/or other examples, modifying the one or more regions of interest may include copying pixels in the one or more regions of interest between the reference image and the target image. In this example and/or other examples, the storage subsystem may further hold instructions executable by the logic subsystem to assess a second error between the first reference image and the first color-corrected image generated based on the second-pass color correction, and responsive to the second error exceeding a second threshold, apply a third-pass color correction to the first target image, where the third-pass color correction includes 1) determining local matrices of contrast correction transformations and brightness correction transformations based on regions of one or more pixels of the first reference image and the first target image, and 2) applying the local matrices of contrast correction transformations and brightness correction transformations to the first target image. In this example and/or other examples, the storage subsystem may further hold instructions executable by the logic subsystem to send, via a computer network, the first color correction and the second color correction to a remote computing system configured to store the first target image and the second target image, and where the remote computing system is configured to apply the first color correction to the first target image to generate the first color-corrected image and apply the second color correction to the second target image to generate the second color-corrected image. In this example and/or other examples, coefficients of a contrast correction transformation matrix and/or coefficients of a brightness correction transformation matrix corresponding to each of the first color correction and the second color correction may be sent to the remote computing system.

In an example, a method for color correcting imagery performed by a computing system, the method comprises receiving a plurality of images of a scene having different levels of detail, determining a first color correction based on a first reference image and a first target image of the plurality of images, where the first reference image has a first level of detail and the first target image has a second level of detail greater that the first level of detail of the first reference image, and where the first color correction includes a first contrast correction transformation matrix of coefficients and a first brightness correction transformation matrix of coefficients, applying the first color correction to the first target image to generate a first color-corrected image having the second level of detail, determining a second color correction based on the first color-corrected image and a second target image of the plurality of images, where the second target image has a third level of detail greater than the second level of detail of the first color-corrected image and where the second color correction includes a second contrast correction transformation matrix of coefficients and a second brightness correction transformation matrix of coefficients, sending, via a computer network, coefficients of the first contrast correction transformation matrix and/or coefficients of the first brightness correction transformation matrix of the first color correction and coefficients of the second contrast correction transformation matrix and/or coefficients of the second brightness correction transformation matrix of the second color correction to a remote computing system configured to store the first target image and the second target image, and where the remote computing system is configured to apply the first color correction to the first target image to generate the first color-corrected image and apply the second color correction to the second target image to generate the second color-corrected image.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for color correcting imagery performed by a computing system, the method comprising:
   receiving a plurality of images of a scene having different levels of detail;
   determining a first color correction based on a first reference image and a first target image of the plurality of images, where the first reference image has a first level of detail and the first target image has a second level of detail greater than the first level of detail of the first reference image;
   applying the first color correction to the first target image to generate a first color-corrected image having the second level of detail;
   determining a second color correction based on the first color-corrected image and a second target image of the plurality of images, where the second target image has a third level of detail greater than the second level of detail of the first color-corrected image; and
   applying the second color correction to the second target image to generate a second color-corrected image having the third level of detail.

2. The method of claim 1, where determining the first color correction includes determining a contrast correction transformation matrix based on the first reference image and the first target image, and determining a brightness correction transformation matrix based on the first reference image and the first target image, and wherein applying the first color correction includes applying the contrast correction transformation matrix and/or the brightness correction transformation matrix to the first target image.

3. The method of claim 1, further comprising:
   assessing a first error between the first reference image and the first color-corrected image;
   responsive to the first error exceeding a first threshold, applying a second-pass color correction to the first target image, where the second-pass color correction includes 1) identifying one or more regions of interest in either the first reference image or the first target image, the one or more regions of interest having a color difference greater than a color difference threshold, 2) re-determining the first color correction based on the first reference image and the first target image while either modifying or ignoring the one or more regions of interest, and 3) applying the re-determined first color correction to the first target image to re-determine the first color-corrected image based on the second-pass color correction.

4. The method of claim 3, where modifying the one or more regions of interest includes copying pixels in the one or more regions of interest between the reference image and the target image.

5. The method of claim 3, further comprising:
assessing a second error between the first reference image and the first color-corrected image as re-determined based on the second-pass color correction; and
responsive to the second error exceeding a second threshold, applying a third-pass color correction to the first target image.

6. The method of claim 5, where the third-pass color correction includes 1) determining local matrices of contrast correction transformations and brightness correction transformations based on regions of one or more pixels of the first reference image and the first target image, and 2) applying the local matrices of contrast correction transformations and brightness correction transformations to the first target image.

7. The method of claim 6, where the third-pass color correction further includes 1) calculating derivatives of the contrast correction transformations and brightness correction transformations of the local matrices to generate masked local matrices, and 2) applying the masked local matrices to the first target image.

8. The method of claim 7, where the third-pass color correction further includes 1) performing a blurring operation on the masked local matrices to generate blurred masked local matrices and 2) applying the blurred masked local matrices to the first target image.

9. The method of claim 1, further comprising:
sending, via a computer network, the first color correction and the second color correction to a remote computing system configured to store the first target image and the second target image, and where the remote computing system is configured to apply the first color correction to the first target image to generate the first color-corrected image and apply the second color correction to the second target image to generate the second color-corrected image.

10. The method of claim 9, where coefficients of a contrast correction transformation matrix and/or coefficients of a brightness correction transformation matrix corresponding to each of the first color correction and the second color correction are sent to the remote computing system.

11. A computing system comprising:
a logic subsystem;
a storage subsystem holding instructions executable by the logic subsystem to:
receive a plurality of images of a scene having different levels of detail;
determine a first color correction based on a first reference image and a first target image of the plurality of images, where the first reference image has a first level of detail and the first target image has a second level of detail greater that the first level of detail of the first reference image;
apply the first color correction to the first target image to generate a first color-corrected image having the second level of detail;
determine a second color correction based on the first color-corrected image and a second target image of the plurality of images, where the second target image has a third level of detail greater than the second level of detail of the first color-corrected image; and
apply the second color correction to the second target image to generate a second color-corrected image having the third level of detail.

12. The computing system of claim 11, where determining the first color correction includes determining a contrast correction transformation matrix between the first reference image and the first target image, determining a brightness correction transformation matrix between the first reference image and the first target image and derived from the contrast correction transformation matrix, and wherein applying the first color correction includes applying the contrast correction transformation matrix and/or the brightness correction transformation matrix to the first target image.

13. The computing system of claim 12, where the contrast correction transformation matrix is based on a quotient of a standard deviation of pixel values of the reference image and a standard deviation of pixel values of the target image.

14. The computing system of claim 12, where the brightness correction transformation matrix is based on a difference of an average pixel value of the reference image and an average pixel value of the target image multiplied by the contrast correction transformation matrix.

15. The computing system of claim 11, where the storage subsystem further holds instructions executable by the logic subsystem to:
assess a first error between the first reference image and the first color-corrected image;
responsive to the first error exceeding a first threshold, apply a second-pass color correction to the first target image, where the second-pass color correction includes 1) identifying one or more regions of interest in either the first reference image or the first target image, the one or more regions of interest having a color difference greater than a color difference threshold, 2) re-determining the first color correction based on the first reference image and the first target image while either modifying or ignoring the one or more regions of interest, and 3) applying the re-determined first color correction to the first target image to generate the first color-corrected image based on the second-pass color correction.

16. The computing system of claim 15, where modifying the one or more regions of interest includes copying pixels in the one or more regions of interest between the reference image and the target image.

17. The computing system of claim 15, where the storage subsystem further holds instructions executable by the logic subsystem to:
assess a second error between the first reference image and the first color-corrected image generated based on the second-pass color correction; and
responsive to the second error exceeding a second threshold, apply a third-pass color correction to the first target image, where the third-pass color correction includes 1) determining local matrices of contrast correction transformations and brightness correction transformations based on regions of one or more pixels of the first reference image and the first target image, and 2) applying the local matrices of contrast correction transformations and brightness correction transformations to the first target image.

18. The computing system of claim 11, where the storage subsystem further holds instructions executable by the logic subsystem to:

send, via a computer network, the first color correction and the second color correction to a remote computing system configured to store the first target image and the second target image, and where the remote computing system is configured to apply the first color correction to the first target image to generate the first color-corrected image and apply the second color correction to the second target image to generate the second color-corrected image.

19. The computing system of claim 18, where coefficients of a contrast correction transformation matrix and/or coefficients of a brightness correction transformation matrix corresponding to each of the first color correction and the second color correction are sent to the remote computing system.

20. A method for color correcting imagery performed by a computing system, the method comprising:

receiving a plurality of images of a scene having different levels of detail;

determining a first color correction based on a first reference image and a first target image of the plurality of images, where the first reference image has a first level of detail and the first target image has a second level of detail greater that the first level of detail of the first reference image, and where the first color correction includes a first contrast correction transformation matrix of coefficients and a first brightness correction transformation matrix of coefficients;

applying the first color correction to the first target image to generate a first color-corrected image having the second level of detail;

determining a second color correction based on the first color-corrected image and a second target image of the plurality of images, where the second target image has a third level of detail greater than the second level of detail of the first color-corrected image and where the second color correction includes a second contrast correction transformation matrix of coefficients and a second brightness correction transformation matrix of coefficients;

sending, via a computer network, coefficients of the first contrast correction transformation matrix and/or coefficients of the first brightness correction transformation matrix of the first color correction and coefficients of the second contrast correction transformation matrix and/or coefficients of the second brightness correction transformation matrix of the second color correction to a remote computing system configured to store the first target image and the second target image, and where the remote computing system is configured to apply the first color correction to the first target image to generate the first color-corrected image and apply the second color correction to the second target image to generate the second color-corrected image.

* * * * *